(12) United States Patent
Vouillamoz et al.

(10) Patent No.: US 11,583,000 B2
(45) Date of Patent: Feb. 21, 2023

(54) DEVICES FOR ACTIVE HUMIDIFICATION AND FLAVOURING

(71) Applicant: Preciflex SA, Neuchâtel (CH)

(72) Inventors: Lucien Vouillamoz, Feusisberg (CH); Alain Jaccard, Ste-Croix (CH)

(*) Notice: Subject to any disclaimer, the term of this patent is extended or adjusted under 35 U.S.C. 154(b) by 672 days.

(21) Appl. No.: 15/579,222

(22) PCT Filed: Jun. 6, 2016

(86) PCT No.: PCT/IB2016/000763
§ 371 (c)(1),
(2) Date: May 11, 2018

(87) PCT Pub. No.: WO2016/193808
PCT Pub. Date: Dec. 8, 2016

(65) Prior Publication Data
US 2018/0177227 A1  Jun. 28, 2018
US 2019/0021394 A9  Jan. 24, 2019

Related U.S. Application Data

(60) Provisional application No. 62/171,257, filed on Jun. 5, 2015, provisional application No. 62/171,251, filed on Jun. 5, 2015.

(51) Int. Cl.
*A24F 25/02* (2006.01)
*A24C 5/60* (2006.01)
(Continued)

(52) U.S. Cl.
CPC .............. *A24F 25/02* (2013.01); *A24C 1/38* (2013.01); *A24C 5/34* (2013.01); *A24C 5/608* (2013.01);
(Continued)

(58) Field of Classification Search
CPC .. A24F 25/02; A24C 1/38; A24C 5/34; A24C 5/608; G05B 19/406; G05B 2219/37375
See application file for complete search history.

(56) References Cited

U.S. PATENT DOCUMENTS 3,360,721 A  12/1967  Pullman
3,732,872 A   5/1973  Lakritz
(Continued)

FOREIGN PATENT DOCUMENTS

CN  102359832 A  2/2012
CN  104023566 A  9/2014
(Continued)

OTHER PUBLICATIONS

International Search Report, International patent application No. PCT/IB2016/000763, dated Oct. 25, 2016.

*Primary Examiner* — Joseph S Del Sole
*Assistant Examiner* — Guy F Mongelli
(74) *Attorney, Agent, or Firm* — Da Vinci Partners LLC; John Moetteli

(57) ABSTRACT

An analysis and/or treatment device (100) for at least one smoking article (60). comprising a closable receptacle (4) for receiving the at least one smoking article (60) therein; a reservoir (62) for a fluid treatment material (8, 9); a hollow injection needle. (2) interiorly insertable into the smoking article (60) received in the receptacle (4) and operably connected to the reservoir (62); means (3) for moving the treatment material (9) from the reservoir (62) through the needle (2) into the interior of the smoking article (60); and at least one sensor means (15) provided in the receptacle (4) for detecting at least one parameter characterizing a property of the smoking article (60) and/or characterizing the treatment conditions in the receptacle (4). A method for applying a treatment to a smoking article (60), wherein the smoking article (60) is enclosed by a receptacle (4), and a treatment (Continued)

material (8,9) is inserted into the receptacle (4) and directly into the interior of the smoking article (60) as a function of parameters measured by sensor means (1), said parameters being indicative of at least one of the temperature and the humidity in the receptacle (4) and the smoking article (60).

54 Claims, 4 Drawing Sheets

(51) Int. Cl.
  *A24C 1/38* (2006.01)
  *A24C 5/34* (2006.01)
  *G05B 19/406* (2006.01)
(52) U.S. Cl.
  CPC .. *G05B 19/406* (2013.01); *G05B 2219/37375* (2013.01)

(56) References Cited

U.S. PATENT DOCUMENTS

| | | | | |
|---|---|---|---|---|
| 4,280,187 | A * | 7/1981 | Reuland | A24C 5/31 131/280 |
| 4,848,369 | A * | 7/1989 | Siems | A24C 5/1835 131/84.4 |
| 6,041,790 | A * | 3/2000 | Smith | A24B 15/16 131/360 |
| 6,089,237 | A * | 7/2000 | Podolak, Jr. | A24F 25/02 131/300 |
| 6,116,029 | A | 9/2000 | Krawec | |
| 6,155,269 | A * | 12/2000 | Franke | A24B 3/04 131/300 |
| 6,276,366 | B1 * | 8/2001 | Fuchigami | A24C 5/34 131/280 |
| 6,517,521 | B1 * | 2/2003 | Ly | A61M 5/329 604/239 |
| 8,991,403 | B2 * | 3/2015 | Chen | A24B 15/20 131/300 |
| 10,905,305 | B2 * | 2/2021 | Monsrud | B08B 3/02 |
| 2006/0125468 | A1 | 6/2006 | Poulet et al. | |
| 2006/0196518 | A1 * | 9/2006 | Hon | H05B 1/0244 131/360 |
| 2007/0102014 | A1 * | 5/2007 | Hafker | B65B 19/02 131/280 |
| 2008/0195244 | A1 * | 8/2008 | Jou | B23Q 15/12 700/174 |
| 2009/0194118 | A1 | 8/2009 | Ademe et al. | |
| 2010/0312364 | A1 * | 12/2010 | Eryilmaz | G05B 13/042 700/30 |
| 2013/0340775 | A1 | 12/2013 | Juster et al. | |
| 2014/0283854 | A1 * | 9/2014 | Magne | A24F 25/02 131/300 |
| 2015/0245667 | A1 * | 9/2015 | Memari | A24F 40/95 131/329 |
| 2015/0246179 | A1 * | 9/2015 | Zur | G16H 20/17 604/506 |

FOREIGN PATENT DOCUMENTS

| | | | |
|---|---|---|---|
| DE | 632490 C | 7/1936 | |
| DE | 10052409 | 11/2000 | |
| GB | 262003 | 12/1926 | |
| WO | WO 2008/121610 | 10/2005 | |
| WO | WO 2010/107613 | 9/2010 | |
| WO | WO 2014/144802 | 9/2014 | |
| WO | WO-2015148649 A2 * | 10/2015 | ............... A24D 3/17 |

* cited by examiner

DEVICES FOR ACTIVE HUMIDIFICATION AND FLAVOURING

CROSS REFERENCE TO RELATED APPLICATIONS

This application is the National Stage of International Application No. PCT/IB2016/00763, filed Jun. 6, 2016, which claims benefit under 35 USC § 119(a), to U.S. provisional patent application Ser. No. 62/171,257, filed Jun. 5, 2015, and to U.S. provisional patent application Ser. No. 62/171,251, filed Jun. 5, 2015.

COPYRIGHT & LEGAL NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. Further, no reference to third party patents or articles made herein is to be construed as an admission that the present invention is not entitled to antedate such material by virtue of prior invention.

BACKGROUND OF THE INVENTION

This invention relates to devices for analyzing, treating or storing cigars or other tobacco products under controlled environment by means of providing a suitable humidity.

Devices for treating smoking articles are known. They generally relate to the treatment of cigarettes, to add aroma substances such as menthol.

For example, GB 262,003 discloses a device for treating a cigarette which includes a cigarette receiver with an open top. A needle is disposed centrally within the receiver for dispensing a treatment fluid throughout the tobacco of a cigarette disposed in the receiver, and a plunger is provided as a means for applying the necessary pressure to deliver a fluid through the needle. An opening is provided only at the tip of the needle.

U.S. Pat. No. 3,732,872 discloses an apparatus for the uniform addition of soluble materials to cigarettes, wherein a syringe with a needle and plunger is secured to a carriage and then inserted into a cigarette, which is placed in a cradle. Through the needle, a solution is dispensed throughout the cigarette.

US 2014/0283854 discloses a similar device with a movable needle that can be used for introducing a fluid into the interior of a smoking article, especially a cigarette. The disclosure of this publication is incorporated herein by reference and part citation.

While such devices could perhaps be used to moisten the interior of a tobacco article such as a cigarette or a cigar with water, to establish the desired humidity of the smoking product for consumption thereof, this aspect is not discussed in the said prior art. It would also be impractical to do so, as the effect of such moisturizing would be difficult or impossible to control.

It is generally known to store smoking articles, especially cigars, in boxes or cabinets known as humidors, to provide the desired moisture level and especially keep them from drying out. Generally, the necessary water is supplied by a moist sponge or a moist hydrogel, e. g. a polyacrylate gel, which lets water evaporate into the atmosphere in the humidor.

Humidors are often provided with a simple humidity indicator, such as a hygroscope. Bigger ones may be provided with means for maintaining an even moisture level throughout the humidor cabinet, e. g. a ventilator. However, all these devices rely on the moisture entering the smoking article from the atmosphere in the humidor, thus from the surface of the smoking article into its interior. They rely on the assumption that the smoking article will have the desired moisture, if the atmosphere in the humidor has a certain moisture level, since it is not possible to detect the actual moisture level in the tobacco product.

The ideal moisture level of a tobacco product depends on its nature, and on the preferences of the consumer. Cigars require a different moisture than cigarettes, and a Brazil cigar may call for a different moisture level than a Cuban cigar. Some smokers prefer a higher moisture level than others. It would therefore be highly desirable if a smoking article could be conditioned specifically and individually, according to its nature and the preferences of the consumer.

The prior art provides no means for satisfying these requirements.

What is needed therefore is a means to analyse and treat tobacco products individually and in a controlled fashion to meet the specific needs of the end consumer.

SUMMARY OF THE INVENTION

The invention meets these requirements and solves the issues left unsolved by the prior art, by the feature combinations of the attached independent claims.

Preferred embodiments are defined in the subclaims.

Where hereinafter the invention is described as a treatment device, it is to be understood that the invention can be used also or alternatively as an analytical device.

According to the invention there is provided a treatment device which is adapted to receive at least one smoking article, especially a cigar. The article is preferably enclosed by a closable receptacle such as a chamber, a box or a cabinet.

In preferred embodiments, the treatment device is handheld and accordingly it is sized such that it is possible to distribute to consumers, and consumers can carry the device with them to apply the treatment substance to smoking articles just before the consumption of the smoking article. Such devices can be used as a portable humidor for a single smoking article, especially a cigar.

In preferred embodiments, the receptacle is shaped and sized to receive a single cigar.

The treatment device is provided with injection means for injecting a fluid into the interior of the smoking article. The injecting means comprise at least one hollow needle, such as a hypodermic needle, which serves to penetrate at least one smoking article along at least part of the length thereof, and in the most preferred embodiments parallel to or along its main longitudinal axis.

In preferred embodiments, the fluid is a liquid, especially water.

The treatment device is provided with at least one sensor which is chosen and positioned, preferably in the receptacle, such that it can detect the effect of injecting the fluid into the smoking article. In preferred embodiments, at least one humidity sensor is provided. More than one sensor can be provided. Usable sensors include temperature sensors, dimensional sensors, surface hardness, elasticity, resilience sensors, sensors capable of determining the type or kind of smoking article inserted in the receptacle (e. g. sensors for detecting the banderole of a cigar) and others.

Sensors can e. g. be placed on the interior wall of the receptacle or directly on the needle.

The at least one sensor will produce a signal which is representative of the parameter or condition the sensor is intended to monitor. Thus, the signal from a moisture sensor indicates the moisture level at the sensing position. If the sensor is positioned on the interior wall of the receptacle, the signal will indicate the moisture level in the receptacle atmosphere. If the sensor is mounted on the needle, it will indicate the moisture level inside the smoking article.

The sensor signal can simply be suitably displayed in a way visible to the user. It can e. g. be used to switch an indicator light on, showing that a desired parameter value has been reached, e. g. a desired moisture level has been established in the smoking article.

The sensor signal may be used to control a liquid level indicator display, of the type known from e. g. U.S. Ser. No. 13/391,386, the complete contents of which are incorporated by reference herewith.

In preferred embodiments, sensor signals are provided to an electronic, preferably digital control device. Such a device can comprise storage of predetermined values for parameters like temperature and moisture, and can comprise a comparator means for detecting a difference between the sensed and the preset values. Deviation of the sensed from the preset value can be indicated e. g. by switching a corresponding light on or off. It can also be used to trigger an automatic response, such as fluid injection into the smoking article.

The control device can be a dedicated system embodied as part of the treatment device or as a separate item, such as a remote control. It can instead be realized using the functionalities available in a PC, a tablet, a mobile phone and other such devices. The necessary software functions can e. g. be supplied by means of an app, which can be provided for downloading and installing from the internet.

Suitable technologies in this context may be similar to those disclosed in US 2013/0340775 and WO2014/144802, the complete disclosure of which is incorporated herein by reference.

In more detail, the said needle can be any dispensing element, which is adapted to extend into the smoking article receptacle and penetrate at least partly into the smoking article to provide a treatment substance to the smoking article.

In particular, the needle is hollow, i. e. has at least one inner channel to provide the treatment substance to the smoking article. The needle may be tapered along at least a part of its longitudinal extension or may have a constant cross section. The needle may have a circular, cylindrical, rectangular, polygonal or any other cross section. The shape of the cross section may vary along the longitudinal extension of the needle. The needle may be substantially flat. The needle may be formed from any material, preferably metal or polymer material.

In particular, a needle with a single opening at the tip can be provided, which nevertheless allows distribution of the treatment fluid along at least a portion of the length of the smoking article. In a more preferred embodiment, the needle is provided with a plurality of openings along its length (for example two, or more than two openings), such that a continuous distribution of a treatment substance can be more readily obtained. The needle may be movable in the receptacle or may be in a fixed position therein.

The needle may be movable between a retracted position and an advanced position, in which it maximally penetrates the smoking article. This configuration is in particular beneficial for embodiments wherein the smoking article receptacle and the needle can be moved relative to each other into a storage configuration of the treatment device. For example, the smoking article receptacle may be telescopable between a collapsed configuration and an extended configuration. The collapsed configuration may serve for storage and transport of the device, whereas the extended configuration may be needed for receiving a smoking article. The telescoping feature may serve to receive articles such as cigars of differing lengths. and the needle storage portion can be folded relative to one another to reduce the size of the device. In this way, the retractability of the needle makes the treatment device more compact and, thus, easier to carry and store.

Smoking articles may be either combustible smoking articles or non-combustible smoking articles. Examples of combustible smoking articles are pipe tobacco, cigarettes or cigars. Combustible smoking articles may have a rod of smokable material and, optionally, a filter. They are not limited to tobacco products, but include materials which can be "smoked", i. e. combusted and the smoke inhaled. As an example of a noncombustible smoking article, a number of smoking articles in which tobacco is heated rather than combusted have been disclosed. In heated smoking articles, an aerosol is generated by heating a flavour generating substrate, such as tobacco. Known heated smoking articles include, for example, electrically heated smoking articles and smoking articles in which an aerosol is generated by the transfer of heat from a combustible fuel element or heat source to a physically separate aerosol forming material. During smoking, volatile compounds are released from the aerosol forming substrate by heat and entrained in air drawn through the smoking article. As the released compounds cool, they condense to form an aerosol that is inhaled by the consumer. As another example of a non-combustible smoking article, smoking articles in which a nicotine-containing aerosol is formed from a tobacco material or other nicotine source without combustion and without addition of heat have been disclosed. Examples are described in WO-A-2008/121610 and WO-A-2010/107613. In these types of smoking articles, a chemical source is provided to generate the nicotine-containing aerosol. In any case, the smoking article may comprise portions, such as a filter, a tobacco rod, or a cartridge, that is subsequently assembled into the smoking article. As used herein, reference to treating a smoking article includes both the treatment of an entire assembled smoking article and the treatment of a portion of the smoking article that can subsequently be assembled to yield a smoking article.

The device comprises means that generate a pressure which allows the provision of the treatment substance to the smoking article. In some embodiments this can be attained by means of a plunger. In other embodiments it may also be possible to operate a pump or other fluid conveying means. It is possible to provide all or a portion of the injection pressure by means of an electrical drive or a mechanical element that stores or transmits energy, such as a spring. In preferred embodiments, the pressure generating means may comprise bellows as generally described in U.S. Ser. No. 14/362,920, the complete contents whereof are herewith incorporated by reference.

In a preferred embodiment, the treatment device is a flavouring device. Thus, it will apply a flavouring substance as a treatment substance into the smoking article. The flavouring substance is e.g. menthol. Preferably, the flavouring substance is a flavourant provided in a liquid carrier. A variety of flavours could be used in the treatment device. In some embodiments, the flavourant is a high potency flavourant, and is typically used at levels that would result in less than 200 parts per million when the smoking article is used. Examples of such flavourants are key tobacco aroma compounds such as beta-damascenone, 2-ethyl3,5-dimethylpyrazine, phenylacetaldehyde, guaiacol, and furaneol. Other flavourants can only be sensed by humans at higher concentration levels. These flavourants, which can be referred to as the low potency flavourants, are typically used at levels that result in orders of magnitude higher amounts of flavourant released into the smoke. Suitable low potency flavourants include, but are not limited to, natural or synthetic menthol, peppermint, spearmint, coffee, tea, spices (such as cinnamon, clove and ginger), cocoa, vanilla, mint flavours, chocolate, eucalyptus, geranium, eugenol and linalool. Preferably, the flavourant includes an essential oil, or a mixture of one or more essential oils. An "essential oil" is a volatile oil having the characteristic odour and flavour of the plant from which it is obtained. Suitable essential oils for inclusion in the flavour granules of the present invention include, but are not limited to, peppermint oil and spearmint oil. Flavouring substances used in preparing shisha tobaccos can be used.

In the alternative, or in addition to flavouring substances, the treatment substance may comprise one or more other functional substances. These functional substances may be used to hinder the formation of, or capture certain smoke constituents. Thus, the treatment substance can also provide the benefit of reducing or removing smoke constituents.

The treatment substance may be a liquid, a solid, a gas, or any combination of these states. Where the device serves as a humidor, the treatment substance will be water. Flavoured or aromatized water can be used in this context.

Preferably, the smoking article receptacle is adapted to hold the smoking article such that a longitudinal axis of the smoking article is substantially aligned with the longitudinal extension of the needle.

In a preferred embodiment, the device comprises at least one reservoir comprising a treatment substance. The reservoir can be a storage chamber which can be filled and refilled by the user. This is especially meaningful if the device is used as a humidor and the treatment material is water. In alternative embodiments, the treatment material (such as an aromatized liquid) can be provided in an exchangeable cartridge. The cartridge enables significant benefits regarding the provision of the treatment substance, as it is not necessary to clean a storage chamber or the device after each treatment operation. This allows in particular that different treatment substances, for example different flavouring substances, can be used subsequently with the same treatment device.

In a preferred embodiment, the storage chamber or the cartridge comprises the amount of treatment substance for the treatment of one smoking article. However, in other embodiments, it is also possible to provide a chamber or a cartridge which allows several subsequent treatment operations for several smoking articles. In one embodiment the cartridge has a cylindrical form, however, in other embodiments, the cartridge may have a rectangular or other cross-sectional shape. The treatment device may provide a cartridge storage compartment for storing several unused or used cartridges.

The needle is preferably exchangeable by the operator. Nevertheless, for treatment devices which should be cost efficient, the needle is directly included or permanently fixed in the device or to a cartridge, such as provided during injection moulding or welded into same. Preferably, one end of the needle is attached to the source or reservoir of the treatment fluid, or fixed to a cartridge, while the other end of the needle is adapted to be inserted into the smoking article.

In a preferred embodiment, the smoking article receptacle comprises a receiving space for the smoking article with a centering device arranged at the opposite side with respect to the needle seat. The centering device serves to keep the smoking article aligned, so that the needle is inserted near to, and along, its longitudinal axis. The centering device may comprise means for determining the diameter of the smoking article. A device for detecting the axial length of the smoking article may also be provided in the receptacle.

The smoking article receptacle is preferably closable by a lid, in particular a hingeable or slidable lid, or a cap that can be screwed onto the receptacle end portion through which the smoking article is inserted. When the lid or cap is open, it allows for inserting and removing the smoking article into and from the smoking article receptacle. When the lid or cap is closed, the receptacle is tightly sealed, the smoking article is protected and safely held during the treatment operation, and the user may be further protected from the needle.

Furthermore, the invention also relates to a method for treating a smoking article, in particular with a handheld treatment device as specified above, which comprises arranging a smoking article in a smoking article receptacle of a treatment device comprising a hollow needle, such that the needle is inserted into the smoking article. A reservoir which contains the treatment substance is connected to the interior of the hollow needle and the treatment substance is forced out of the reservoir and through the needle into the smoking article. At least one sensor is provided to sense a parameter prevalent in the treatment receptacle, which may be related to the effect of injecting the treatment substance, and to provide a corresponding output signal.

Preferred methods of this invention are described in the attached flowcharts, according to FIGS. 3 and 4.

Those skilled in the art will appreciate that elements in the figures are illustrated for simplicity and clarity and have not necessarily been drawn to scale. For example, dimensions may be exaggerated relative to other elements to help improve understanding of the invention and its embodiments. Furthermore, when the terms 'first', 'second', and the like are used herein, their use is intended for distinguishing between similar elements and not necessarily for describing a sequential or chronological order. Moreover, relative terms like 'front', 'back', 'top' and 'bottom', and the like in the description and/or in the claims are not necessarily used for describing exclusive relative position. Those skilled in the art will therefore understand that such terms may be interchangeable with other terms, and that the embodiments described herein are capable of operating in other orientations than those explicitly illustrated or otherwise described.

DETAILED DESCRIPTION OF THE PREFERRED EMBODIMENT

The following description is not intended to limit the scope of the invention in any way as they are exemplary in nature and serve to describe the best mode of the invention known to the inventors as of the filing date hereof. Consequently, changes may be made in the arrangement and/or function of any of the elements described in the disclosed exemplary embodiments without departing from the spirit and scope of the invention.

Figure 1:
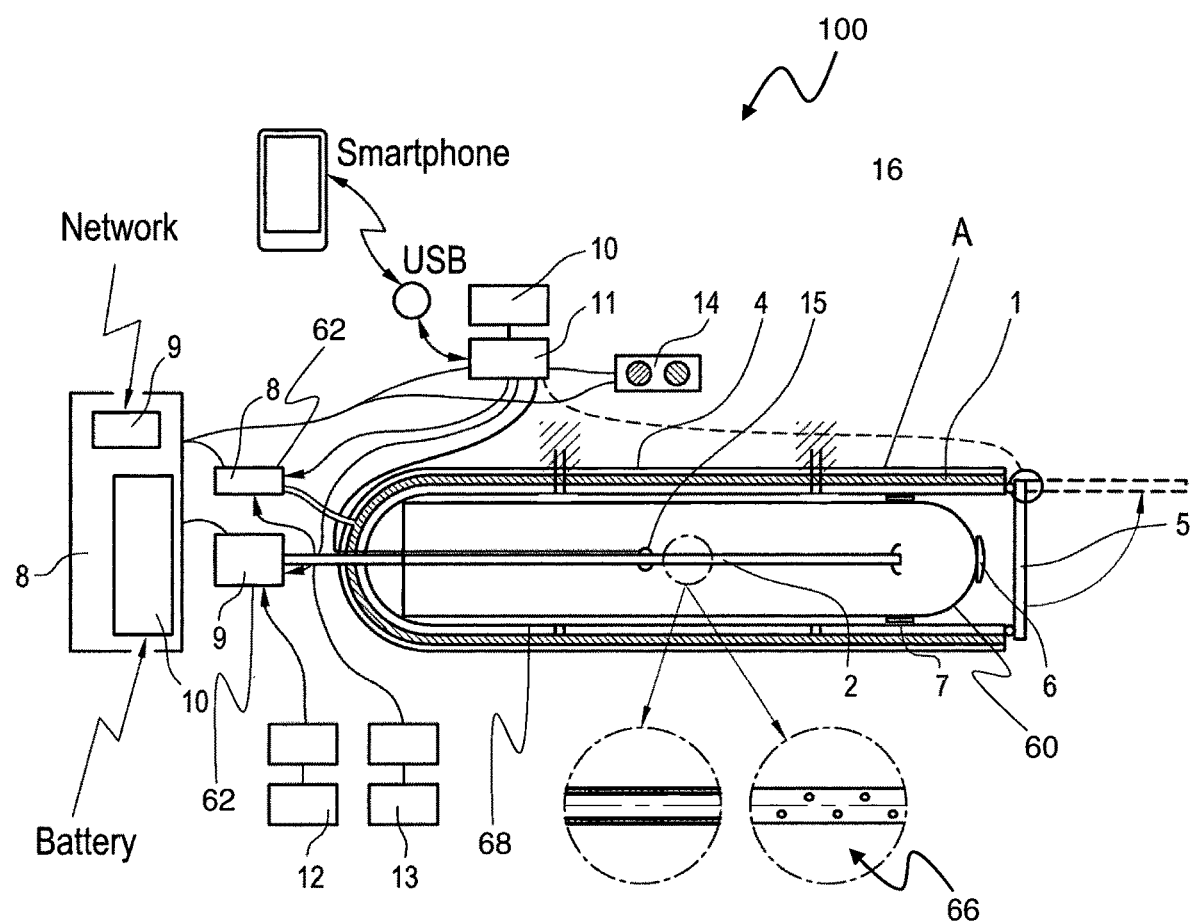
FIG. 1 is a schematic view illustrating the functional principle of the device.

FIG. 1 illustrates the functional principle of the device of system 100 of the present invention and specially its use for treatment. The system can however be used for analysis without treatment or preceding later treatment, as will be explained in some more detail with reference to FIG. 2.

System 100 includes a receptacle 4 to place a tobacco product (not shown). The system 100 is equipped with a perforated hollow needle 2. The needle 2 may be movable in its longitudinal direction to adapt to the different length of the tobacco products and to offer to choose the penetration depth into the tobacco products. Alternatively, the needle 2 may be in fixed position with respect to the receptacle 4.

The receptacle 4 is basically tubular and may be generally cylindrical, especially where the smoking article is a single cigar.

The receptacle 4 has an exterior wall and a lid 5, which serves to tightly close the receptacle 4, preventing the escape of treatment material and the ingress of materials from the outside.

The receptacle 4 is interiorly provided with means 6 to determine the longitudinal extension of the smoking article, e. g. the length of a cigar. This can be used to automatically determine the amount of treatment material required to condition the smoking article. Likewise the receptacle 4 comprises means 7 to determine the diameter of the smoking product.

Since optimum conditions for treatment may require the smoking product to be at a specific temperature, the system 100 comprises a vapor generator 8, which is adapted to produce vapor (generally, water vapor) at a desired temperature. This may e. g. serve to humidify and/or warm up the smoking article.

Similarly, the system 100 may comprise a sub-system 9 for preparing a liquid (e. g., water) for interiorly humidifying the smoking article by means of needle 2. Sub-system 9 will then be directly communicating with the interior space of hollow needle 2. It should be observed that the quantity of this liquid may have to be carefully controlled. Too much injected liquid may harm the combustion performance of the smoking product. Too little injected liquid may be insufficient to properly humidify the smoking article. Preferably, the system 100 therefor provides this control function through a separate sub-system 9, which has its own power supply (battery) and a control panel 10. The control panel 10 is adapted to indicate the conditions prevailing in the receptacle 1 and may be adapted to permit inputs of target condition parameters by a user. The control panel 10 may comprise software suitable for controlling the treatment device, to change and/or maintain the desired conditions of temperature, humidity and in case other parameters therein. The control panel 10 may interact with an electronic subsystem 11, which manages the humidification taking account the input from means 6 and 7, and in case input from the user, from the internet (e. g. available info related to the specific brand of smoking article to be treated) etc.

Especially for such purposes, the system 100 may be able to communicate with a personal electronic device such as a smartphone, permitting individual user inputs, the relay of information back to the producer of the device or even the producer of the smoking article.

The control panel 10 may thus be connectable to other devices, especially through the internet, which may enable remote control of the system by a user. Alternatively, the control panel may be embodied as a stand-alone device.

A sub-system 12 is provided to supply additives to the treatment material, e. g. aromatized liquids such as alcoholic liqueurs. This allows a particular bottling and an identification between a brand of liqueur and a brand of smoking article, especially where the inventive system is embodied as a cigar humidor.

The system 100 comprises a reservoir for distilled water 13, that can be mixed with additives from sub-system 12.

An indicator 14 is provided to signal that the treatment of the smoking article has been finalized.

Sensors 15 may be provided interiorly of the receptacle 4 and/or on the needle 2, to determine parameters such as temperature and humidity. It is preferred to have at least one such sensor 15 directly in or on the needle 2, in the area thereof which is inserted into the smoking article.

The system 100 comprises an interface 16, preferably used to exchange data and/or to energize the system.

Figure 2:
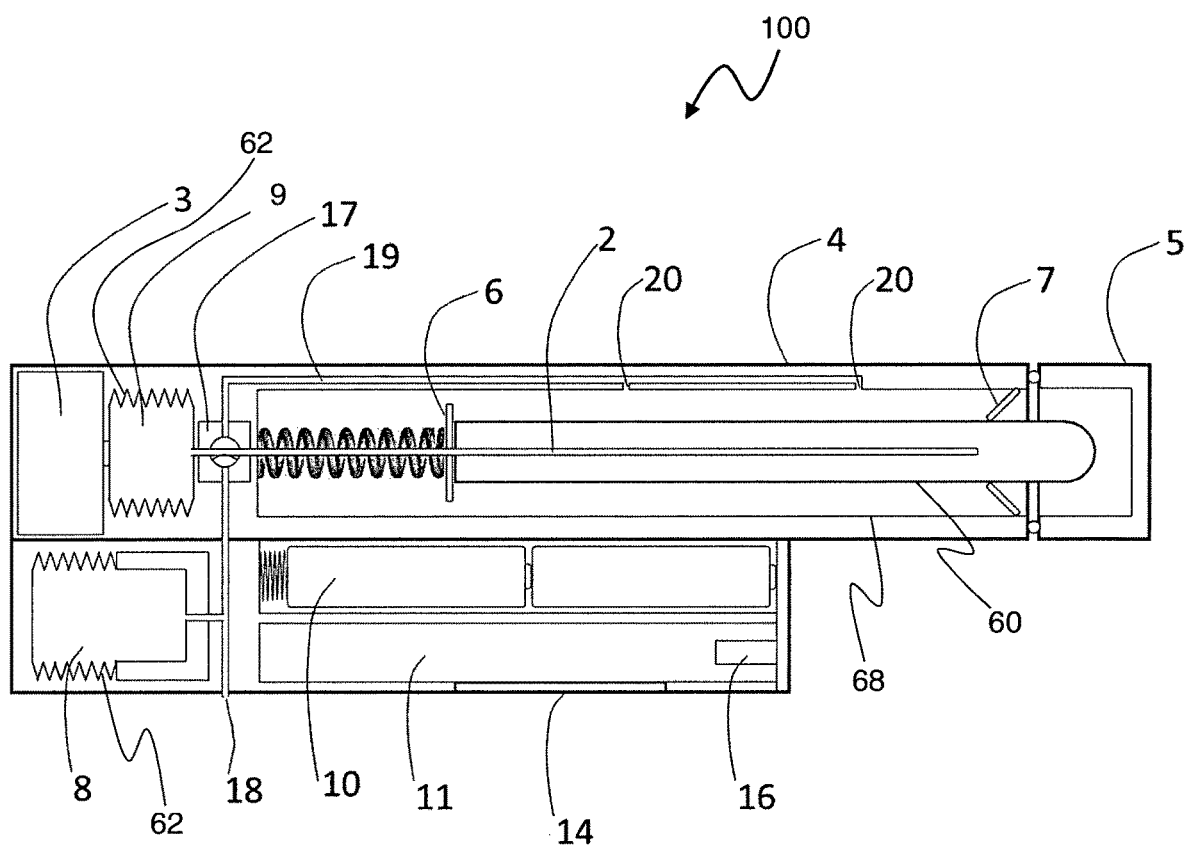
FIG. 2 is a partial cross-sectional schematic view of a preferred embodiment.

Turning to FIG. 2, this schematically shows a preferred embodiment of the treatment device serving a portable analyser and/or humidor for a single cigar.

The receptacle 4 is shown with a cigar 60 inserted. The lid 5 has already been closed. Injection needle 2 penetrates cigar 60 and extends in its longitudinal direction generally along the main longitudinal axis of cigar 60.

Cigar 60 is inserted in receptacle 4 such that its length and diameter can be detected by means (6,7). Sensor means (not shown) can be used to identify the type and brand of cigar 60, e. g. by reading the banderole, by the cigar's typical dimensions etc. Other sensor means (not shown) can be used to determine the actual surface elasticity and hardness of the cigar, which is an important indicator of sufficient humidity as well as physical integrity (e. g. cracks). All such sensor means can be housed and operated inside receptacle 4. Their operation can be triggered automatically, by the acts of inserting the cigar into the receptacle and closing the lid, or they can be selectable and startable by the user.

A valve 17 is shown set to connect the interior of needle 2 with a flexible chamber 62. Chamber 62 is a bellows-type structure that can be expanded or compressed by a linear actuator 3.

In a first step of the inventive method, linear actuator 3 pulls the flexible chamber 62 to expand it, thereby pulling a sample of the atmosphere inside cigar 60 into the flexible chamber 62. Sensor means (not shown) in flexible chamber 62 detect parameters which characterize the actual condition of the cigar, including the humidity and temperature parameters prevailing inside cigar 60.

Then, linear actuator 3 compresses flexible chamber 62, expelling the sample therefrom.

The data collected by the sensor means will be transferred to an electronic device 11, which may be set up to display the corresponding information on the cigar and its condition, and may offer a selection of treatment steps to the user, or automatically initiate such treatment.

Assuming that treatment is desired, valve 17 is then actuated to disconnect needle 2 from flexible chamber 62, instead connecting said chamber with a channel 19 which opens at various positions 20 into the interior of receptacle 4.

Linear actuator 3 is operated again to expand flexible chamber 62, thus taking a sample of the atmosphere in receptacle 4 by means of channel 19. Sensor means in flexible chamber 62 detect the temperature and humidity in receptacle 4.

Linear actuator 3 is then operated to compress flexible chamber 62 and expel the sample.

Based on the detected parameters (cigar size, temperatures and humidities in cigar and in receptacle) the electronic device 11 determines the required type and amount of treatment material.

A preparation chamber 8 is used to mix the components of the treatment material. If the device simply serves as a portable humidor, the treatment material may just be distilled water in liquid or, preferably, vapor form. In this case, preparation chamber 8 just acts as a vapor generator.

Valve 17 is then set to connect chambers 8 and 62. The treatment material is pulled into chamber 62 by the linear actuator 3.

If it is desired to treat the cigar 60 interiorly, valve 17 is then set to connect flexible chamber 62 with the needle 2.

If it is instead desired to modify the atmosphere in receptacle 4, valve 17 is set to connect flexible chamber 62 with channel 19.

In both cases, linear actuator 3 is actuated to compress flexible chamber 62 and push the treatment material out of flexible chamber 62 into either needle 2 or channel 19.

The effects of this treatment are detected by repeating the first steps of this procedure. If necessary, the treatment steps are then also repeated.

The endpoint is reached when the detected parameters conform with the preset values. This situation is indicated by indicator 14 giving a corresponding signal.

A variant of the system 100 does use information form a database accessible on the system 100, or accessible e.g. via a network, to propose different treatments suitable to types of tobacco products.

Another variant of the system 100 does have a system to recognize the inserted tobacco product. Based on that information, the system 100 can suggest specific treatments suitable to the recognized tobacco product.

Figure 3:
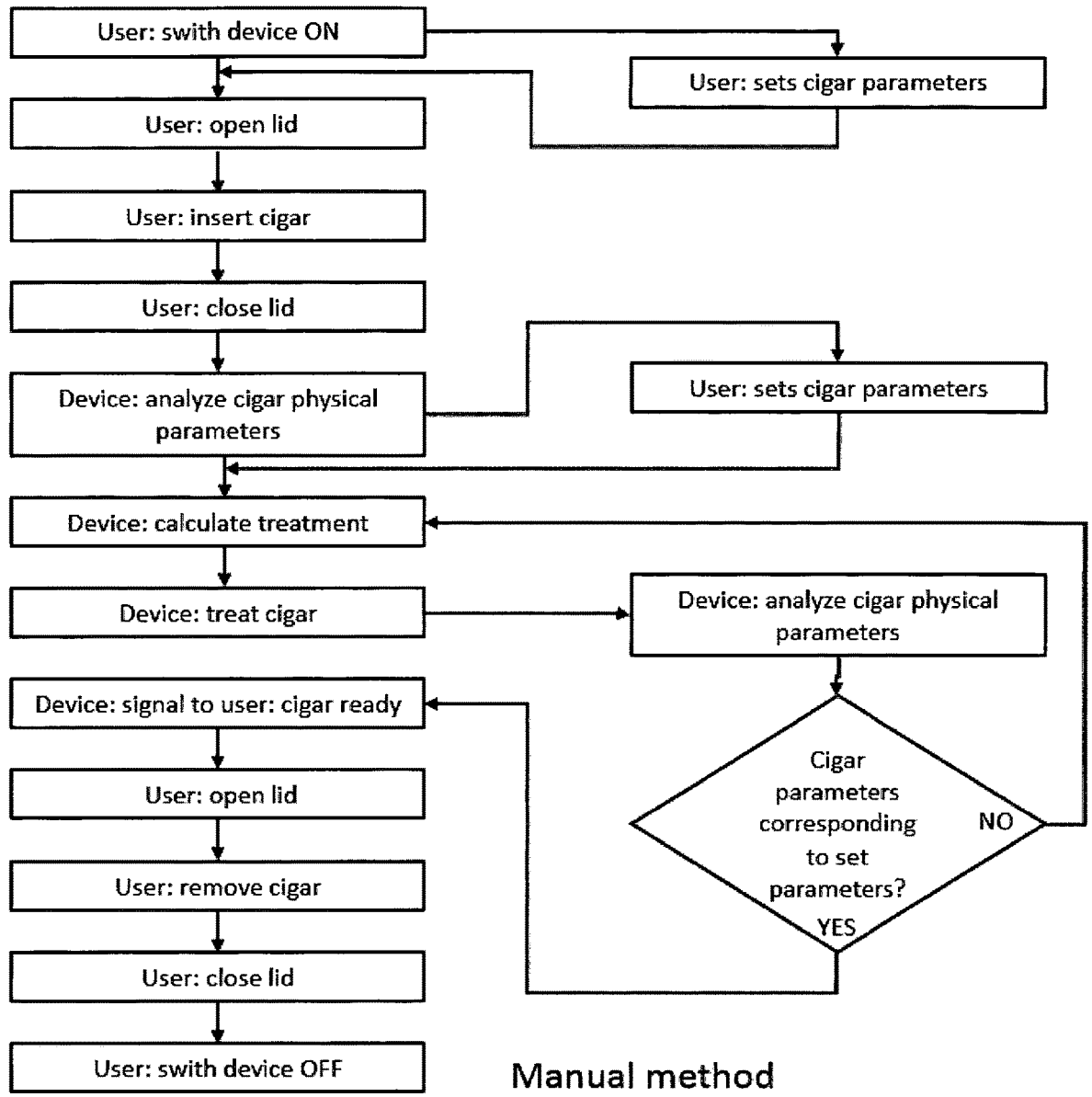
FIGS. 3 and 4 are flowcharts for preferred embodiments of the inventive method.
Figure 4:
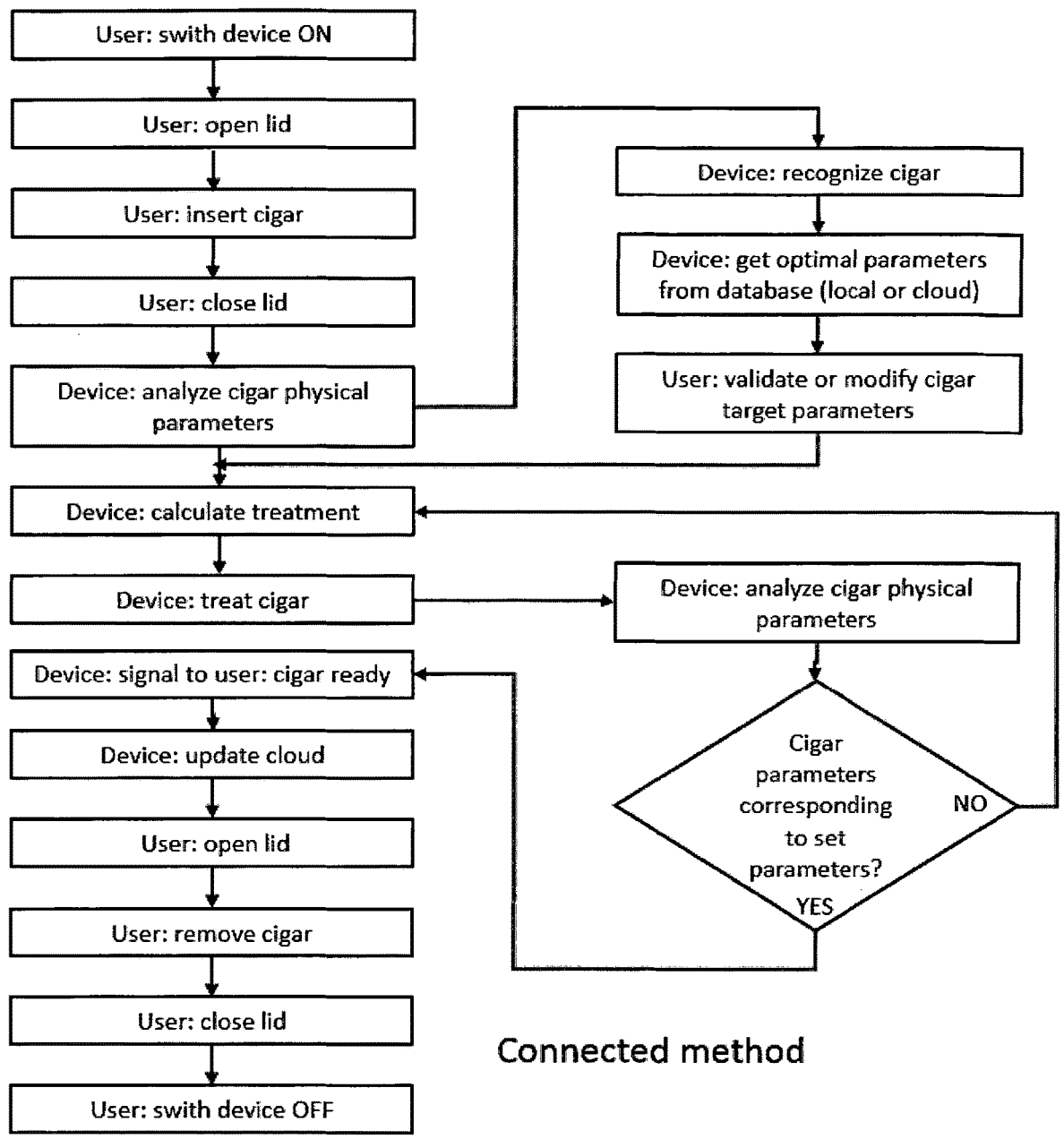

Further details of such methods are notable from FIGS. 3 and 4, which relate to preferred embodiments.

It should be appreciated that the particular implementations shown and described herein are representative of the invention and its best mode and are not intended to limit the scope of the present invention in any way. Furthermore, any connecting lines shown in the various figures contained herein are intended to represent exemplary functional relationships and/or physical couplings between various elements. It should be noted that many alternative or additional physical connections or functional relationships may be present and apparent to someone of ordinary skill in the field.

Moreover, the apparatus, system and/or method contemplates the use, sale and/or distribution of any goods, services or information having similar functionality described herein.

The specification and figures are to be considered in an illustrative manner, rather than a restrictive one and all modifications described herein are intended to be included within the scope of the invention claimed, even if such is not specifically claimed at the filing of the application. Accordingly, the scope of the invention should be determined by the claims appended hereto or later amended or added, and their legal equivalents rather than by merely the examples described above. For instance, steps recited in any method or process claims should be construed as being executable in any order and are not limited to the specific order presented in any claim. Further, the elements and/or components recited in any apparatus claims may be assembled or otherwise operationally configured in a variety of permutations to produce substantially the same result as the present invention. Consequently, the invention is not limited to the specific configuration recited in the claims.

Benefits, other advantages and solutions mentioned herein are not to be construed as necessary, critical, or essential features or components of any or all the claims.

As used herein, the terms "comprises", "comprising", or any variation thereof, are intended to refer to a non-exclusive listing of elements, such that any process, method, article, composition or apparatus of the invention that comprises a list of elements does not include only those elements recited, but may also include other elements described in this specification. The use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or otherwise adapted by the skilled artisan to other design without departing from the general principles of the invention.

The patents and articles mentioned above are hereby incorporated by reference herein, unless otherwise noted, to the extent that the same are not inconsistent with this disclosure. Other characteristics and modes of execution of the invention are described in the appended claims. Further, the invention should be considered as comprising all possible combinations of every feature described in the instant specification, appended claims, and/or drawing figures which may be considered new, inventive and industrially applicable.

Multiple variations and modifications are possible in the embodiments of the invention described here. Although certain illustrative embodiments of the invention have been shown and described here, a wide range of modifications, changes, and substitutions is contemplated in the foregoing disclosure. While the above description contains many specifics, these should not be construed as limitations on the scope of the invention, but rather as exemplifications of one or another preferred embodiment thereof. In some instances, some features of the present invention may be employed without a corresponding use of the other features. In addition, the term "flexible" as used herein encompasses the concept of variable, in that a variable volume reservoir should be considered a flexible chamber, even if no individual components flex. Accordingly, it is appropriate that the foregoing description be construed broadly and understood as being given by way of illustration and example only, the spirit and scope of the invention being limited only by the claims which ultimately issue in this application.

What is claimed is:

1. An analysis and treatment device for at least one smoking article, comprising a closable receptacle for receiving the at least one smoking article therein; the device further including a reservoir for a fluid treatment material; at least one hollow injection needle adapted to be insertable into the interior of the smoking article received in the receptacle and operably connected to the reservoir; a fluid conveying device for moving the treatment material from the reservoir through the at least one needle having a plurality of perforations along its length, directly into the interior of the smoking article therby dispensing the fluid throughout the smoking article such that a continuous distribution of a treatment substance can be more readily obtained; and at least one sensor adapted for sensing in the the needle-receptacle region configured to detect the humidity of the smoking article of the receptacle.

2. The device of claim 1, wherein the device comprises a further sensor configured to detect the type of the smoking article.

3. The device of claim 1, wherein the smoking article is a cigar.

4. The device of claim 1, wherein at least one sensor is provided on an interior wall of the receptacle.

5. The device of claim 1, wherein at least one sensor is provided in or on the at least one needle.

6. The device of claim 1, wherein the at least one sensor is operably connected to a signalling device adapted for indicating a signal output from the sensor.

7. The device of claim 1, wherein the sensor is operably connected to a control device adapted for receiving a signal output from the sensor and displaying corresponding information on the characteristics of the smoking article and/or initiating an operation of the treatment device in response thereto.

8. The device of claim 7, wherein the response comprises the injection of treatment material into the smoking article.

9. The device of claim 7, wherein the response comprises the release of treatment material into the receptacle.

10. The device of claim 7, wherein the control device comprises stored preset values for at least one parameter which corresponds to a desired condition in the receptacle and/or the smoking article.

11. The device of claim 7, wherein the control device comprises stored preset values for at least one parameter which corresponds to a desired condition of the smoking article.

12. The device of claim 7, wherein the control device is adapted to receive preset values from a user.

13. A method for applying a treatment to a smoking article, the method including the steps of:
(a) enclosing the smoking article in a receptacle, and
(b) inserting a treatment material into the receptacle and directly into the interior of the smoking article as a function of at least one parameter measured by a sensor located in the at least one needle, said at least one parameter being indicative of humanity.

14. The device of claim 1, wherein the device comprises a sensor configured to determine the brand of the smoking article.

15. The device of claim 1, wherein the device comprises a sensor configured to determine the dimensions such as length and diameter of the smoking article.

16. The device of claim 1, where in the device comprises a sensor configured to determine the temperature in the receptacle.

17. The device of claim 1, wherein the device comprises a sensor configured to determine the temperature in the smoking article.

18. The device of claim 1, wherein the device comprises a sensor configured to determine mechanical properties of the smoking article.

19. The device of claim 18, wherein the mechanical properties include one of the group of properties consisting of surface hardness; surface resilience; surface elasticity; density; interior hardness; resilience; and elasticity.

20. The device of claim 1, wherein the device is a flavouring device configured to apply a flavouring substance as a treatment substance into the smoking article.

21. The device of claim 20, wherein the flavouring substance is selected from one of the group of flavouring substances consisting of menthol, peppermint, spearmint, coffee, tea, spices, cinnamon, clove, ginger, cocoa, vanilla, mint flavours, chocolate, eucalyptus, geranium, eugenol and linalool.

22. The device of claim 20, wherein the flavouring substance is a flavourant provided in a liquid carrier.

23. The device of claim 20, wherein the flavourant is a high potency flavourant, and is typically used at levels that would result in less than 200 parts per million when the smoking article is used.

24. The device of claim 20, wherin the flavourants are key tobacco aroma compounds.

25. The device of claim 20, wherein the flavourant includes an essential oil, a mixture of one or more essential oils.

26. The device of claim 25, wherein the essential oils are selected from one of the group of essential oils consisting of peppermint oil and spearmint oil.

27. The device of claim 23, wherein the flavourant includes an essential oil, or a mixture of one or more essential oils.

28. The device of claim 27, wherein the essential oils are selected from one of the group of essential oils consisting of peppermint oil and spearmint oil.

29. The device of claim 24, wherein the key tobacco aroma compounds are selected from one of the group of key tobacco aroma compounds consisting of beta-damascenone, 2ethyl3,5-dimethylpyrazine, phenylacetaldehyde, guaiacol, and furaneol.

30. The device of claim 13, wherein at least one sensor is provided in or on the at least one needle.

31. An analysis device for a single smoking article, the device characterized in that the device comprises a hollow needle insertable into the smoking article,
the device further comprises a sensor adapted to sense at least the internal humidity of the smoking article via the interior conduit of the hollow needle, a signaling device adapted for communicating a signal output from the sensor, a control device adapted for receiving a signal output from the sensor and displaying corresponding information on the characteristics of the smoking article.

32. The device of claim 31, wherein the device comprises a further sensor configured to detect the kind of the smoking article.

33. The device of claim 31, wherein the single smoking article is a cigar.

34. The device of claim 31, wherein the sensor is provided in or on the needle.

35. The device of claim 31, wherein the sensor is operably connected to a signalling device adapted for indicating a signal output from the sensor.

36. The device of claim 31, wherein the sensor is operably connected to the control device further adapted for initiating an operation of a treatment device in response thereto, the treatment device comprising a receptacle adapted for receiving the at least one smoking article therein.

37. The device of claim 36, wherein the response comprises the injection of treatment material into the smoking article.

38. The device of claim 36, wherein the response comprises the release of treatment material into the receptacle.

39. The device of claim 37, wherein the control device comprises stored pre-set values for at least one parameter which corresponds to a desired condition in the receptacle and/or the smoking article.

40. The device of claim 36, wherein the control device comprises stored pre-set values for at least one parameter which corresponds to a desired condition of the smoking article.

41. The device of claim 36, wherein the control device is adapted to receive present values from a user.

42. The device of claim 36, wherein the device comprises a sensor configured to determine the brand of the smoking article.

43. The device of claim 31, wherein the device comprises a sensor configured to determine the dimensions such as length and diameter of the smoking article.

44. The device of claim 31, wherein the device comprises a sensor configured to determine the temperature in the smoking article.

45. The device of claim 31, wherein the device comprises a sensor configured to determine mechanical properties of the smoking article.

46. The device of claim 31, wherein the mechanical properties include one of the group of properties consisting of surface hardness; surface resilience; surface elasticity; density; interior hardness; resilience; and elasticity.

47. The device of claim 46, wherein the treatment device is a flavouring device configured to apply a flavouring substance as a treatment substance into the smoking article.

48. The device of claim 47, wherein the flavouring substance is selected from one of the group of flavouring substances consisting of menthol, peppermint, spearmint, coffee, tea, spices, cinnamon, clove, ginger, cocoa, vanilla, mint flavours, chocolate, eucalyptus, geranium, eugenol and linalool.

49. The device of claim 47, wherein the flavouring substance is a flavourant provided in a liquid carrier.

50. The device of claim 49, wherein the flavourant is a high potency flavourant, and is typically used at levels that would result in less than 200 parts per million when the smoking article is used.

51. The device of claim 49, wherein the flavourants are key tobacco aroma compounds.

52. The device of claim 49, wherein the flavourant includes an essential oil, or a mixture of one or more essential oils.

53. The device of claim 52, wherein the essential oils are selected from one of the group of essential oils consisting of peppermint oil and spearmint oil.

54. The device of claim 51, wherein the key tobacco aroma compounds are selected from one of the group of key tobacco aroma compounds consisting of beta-damascenone, 2-ethyl3,5-dimethylpyrazine, phenylacetaldehyde, guaiacol, and furaneol.

\* \* \* \* \*

UNITED STATES PATENT AND TRADEMARK OFFICE
CERTIFICATE OF CORRECTION

PATENT NO. : 11,583,000 B2
APPLICATION NO. : 15/579222
DATED : February 21, 2023
INVENTOR(S) : Lucien Vouillamoz and Alain Jaccard It is certified that error appears in the above-identified patent and that said Letters Patent is hereby corrected as shown below:

On the Title Page

- Correct the title to read "DEVICE FOR ACTIVE HUMIDIFICATION AND FLAVOURING, SYSTEM AND METHOD" instead of "DEVICE FOR ACTIVE HUMIDIFICATION AND FLAVOURING".
- Correct the applicant's name to read "Hulecos SA" instead of "Preciflex SA".

In the Specification

- Column 1, Lines 1-2, Correct the title to read "DEVICE FOR ACTIVE HUMIDIFICATION AND FLAVOURING, SYSTEM AND METHOD" instead of "DEVICE FOR ACTIVE HUMIDIFICATION AND FLAVOURING".

In the Claims

- Claim 39: please replace the phrase "The device of claim 37,..." with the phrase "The device of claim 36,...".
- Claim 42: please replace the phrase "The device of claim 36,..." with the phrase "The device of claim 31,...".
- Claim 46: please replace the phrase "The device of claim 31,..." with the phrase "The device of claim 45,...".
- Claim 47: please replace the phrase "The device of claim 46,..." with the phrase "The device of claim 36,...".
- Claim 54: please replace the phrase "The device of claim 51,..." with the phrase "The device of claim 53,...".

Signed and Sealed this
Twenty-seventh Day of June, 2023

Katherine Kelly Vidal
*Director of the United States Patent and Trademark Office*